United States Patent
Okuda

(10) Patent No.: US 6,860,202 B2
(45) Date of Patent: Mar. 1, 2005

(54) PRINTING PRESS EQUIPPED WITH COLOR CHART MEASURING APPARATUS

(75) Inventor: Tsuyoshi Okuda, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/801,605

(22) Filed: Mar. 17, 2004

(65) Prior Publication Data

US 2004/0173111 A1 Sep. 9, 2004

Related U.S. Application Data

(62) Division of application No. 09/972,244, filed on Oct. 9, 2001, now Pat. No. 6,715,417.

(30) Foreign Application Priority Data

| Oct. 13, 2000 | (JP) | .................................. P2000-313250 |
| Oct. 19, 2000 | (JP) | .................................. P2000-319662 |
| Oct. 19, 2000 | (JP) | .................................. P2000-319663 |

(51) Int. Cl.⁷ .............................................. B41M 1/54
(52) U.S. Cl. ..................... 101/484; 101/483; 101/211; 101/181
(58) Field of Search ................................ 101/181–185, 101/170–171, 211, 216, 248, 350, 481–486, 364, 365, 174, 175, 177, 229–231, 136, 137, 142–144

(56) References Cited

U.S. PATENT DOCUMENTS

| 4,428,287 A | | 1/1984 | Greiner |
| 4,649,502 A | | 3/1987 | Keller et al. |
| 4,852,485 A | * | 8/1989 | Brunner ...................... 101/211 |
| 5,182,721 A | | 1/1993 | Kipphan et al. |
| RE35,495 E | | 4/1997 | Bolza-Schuenemann et al. |
| 6,009,807 A | | 1/2000 | Yoshida et al. |
| 6,041,708 A | | 3/2000 | Kipphan et al. |
| 6,100,982 A | | 8/2000 | Tobias et al. |
| 6,192,801 B1 | * | 2/2001 | Papritz et al. ............... 101/484 |
| 6,564,714 B2 | * | 5/2003 | Brydges et al. .............. 101/484 |

FOREIGN PATENT DOCUMENTS

| DE | 44 36 583 A1 | 10/1994 |
| EP | 0 518 559 A1 | 12/1992 |

(List continued on next page.)

*Primary Examiner*—Minh Chau
(74) *Attorney, Agent, or Firm*—McDermott Will & Emery LLP

(57) ABSTRACT

A reading time setting section (44) determines a read area for an imaging section (25) on the basis of color chart positional data (id). The imaging section (25) reads an image on printing paper during the reading time and readout image data (rd) is stored in an image data storage section (45). A reference mark detecting section (46) detects the positions of reference marks from the readout image data (rd). A color chart actual position calculation section (47) corrects a tilt of a color chart determined from the positions of the reference marks and calculates an actual position of each of color chart fields (cr). An image data readout section (48) reads out image data on a color chart field corresponding to the calculated actual position. At the same time, image data on a white color field immediately above the color chart field is also read out. A white color correction section (49) produces a white reference on the basis of the image data on the white color field and corrects the image data on the color chart field. A color chart information determination section (50) measures color chart information, such as a color density and a dot percentage, about each of the color chart fields. This printing press determines a reading time on the basis of the position of the color chart at the time of printing plate recording and thereby allows imaging of an area including the color chart on the printing paper being transported.

5 Claims, 10 Drawing Sheets

FOREIGN PATENT DOCUMENTS

| | | |
|---|---|---|
| EP | 0 767 059 A2 | 4/1997 |
| EP | 0 836 942 A1 | 4/1998 |
| EP | 1 149 703 A2 | 10/2001 |
| JP | 58-59845 | 4/1983 |
| JP | 59-035280 | 2/1984 |
| JP | 61-100455 | 5/1986 |
| JP | 63-234765 | 9/1988 |
| JP | 03-015553 | 1/1991 |
| JP | 4-4465 | 1/1992 |
| JP | 04-201280 | 7/1992 |
| JP | 04-250041 | 9/1992 |
| JP | 04-351554 | 12/1992 |
| JP | 05-338121 | 12/1993 |
| JP | 06-040010 | 2/1994 |
| JP | 07-089053 | 4/1995 |
| JP | 8-171640 | 7/1996 |
| JP | 08-171640 | 7/1996 |
| JP | 09-186900 | 7/1997 |
| JP | 09-312765 | 12/1997 |
| JP | 10-175290 | 6/1998 |
| JP | 2824334 | 9/1998 |
| JP | 10-272756 | 10/1998 |
| JP | 11-165398 | 6/1999 |
| JP | 11-252392 | 9/1999 |
| JP | 11-258712 | 9/1999 |
| JP | 11-308404 | 11/1999 |
| JP | 2000-006374 A | 1/2000 |
| JP | 2000-134379 A | 5/2000 |
| JP | 2001-145122 A | 5/2001 |
| WO | WO 92/12011 | 7/1992 |

* cited by examiner

F I G . 6 A
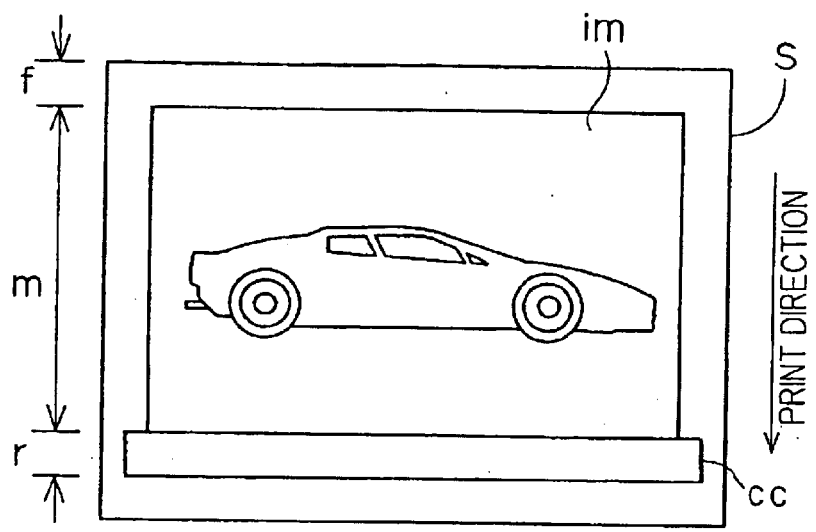
F I G . 6 B
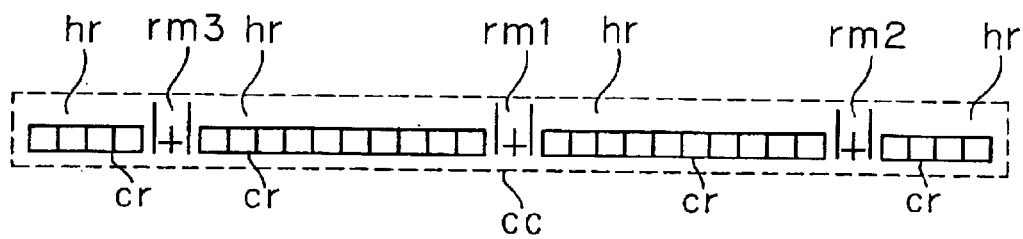
F I G . 6 C
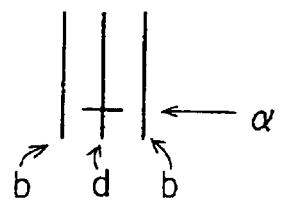
F I G . 6 D

PRINTING PRESS EQUIPPED WITH COLOR CHART MEASURING APPARATUS

This application is a divisional of application Ser. No. 09/972,244 filed Oct. 9, 2001, now U.S. Pat. No. 6,715,417.

BACKGROUND OF THE INVENTION

1. Field of the Invention

The present invention relates to a printing press for doing printing such as offset printing in which inks are applied to printing plates to form ink images, which are then transferred onto printing paper. And especially, the present invention relates to a printing press equipped with a color chart measuring apparatus for reading a color chart printed on printing paper to acquire color chart information.

2. Description of the Background Art

Recently, printing presses which install therein a plate making machine (printing plate recording apparatus) for forming an image on a printing plate on the basis of digital image data, known as a CTP (computer-to-plate) machine, have been developed for commercial use. Such printing presses are called digital printing presses and are suitable for short-time print jobs such as multi-kinds, small-circulation printing, since they can produce printed matter directly from image data. Those digital printing presses have automatized a prepress process for ease of handling by even inexperienced operators, but still further automation of a printing process, such as ink feed control, is desired.

For the control of ink feed, conventional printing presses have generally used a separate type color measurement table for measuring a picked-up printed sample placed thereon. This, however, requires an operator to pick up an appropriate printed sample for color measurements of printed matter.

To solve this problem, printing presses comprising means for capturing an image of printing matter have been proposed. According to this conventional technique, the printing press obtains image data through imaging of printing matter on its impression cylinder and compares this image data with previously-obtained reference image data about reference printing matter for ink feed control. In this conventional technique, an image of printing matter is captured within the printing press, which brings the advantage of avoiding operator involvement which would be required when using the color measurement table.

The above conventional technique, however, has a problem that reading and comparing a whole image of printing matter with a reference image requires handling of a large amount of image data and requires much time for image data processing. In addition, the preparation of a reference image is not suitable for print jobs which require immediacy, such as multi-kinds, small-circulation printing.

SUMMARY OF THE INVENTION

The present invention is intended to solve the aforementioned conventional problems, and an object thereof is to provide a printing press equipped with a color chart measuring apparatus for providing a color chart on printing matter, instead of reading a whole image of the printing matter, and then reading and measuring only an area relating to the color chart on printing paper being transported. In this case, the amount of image data to be handled can be reduced and the use of the color chart avoids the necessity of preparing a reference image.

The present invention is especially suitable for a printing press equipped with a printing plate recording apparatus for recording an image on a printing plate, such as digital printing presses as above described. It provides a printing press capable of setting an area to read a color chart according to the recording position of the color chart in image recording.

Another object of the present invention is to provide a color chart that allows precise measurement and to provide a color chart measuring method and apparatus capable of measuring a color chart on printing paper being transported with high accuracy even if flapping or the like of the printing paper being transported causes variations in the imaging level in different parts of the printing paper.

A first aspect of the present invention is directed to a printing press for printing a color chart including a plurality of color chart fields in a margin of printing paper, said printing press equipped with a color chart measuring apparatus for reading each of the color chart fields on the printing paper to measure color chart information. The printing press comprises: a transport section for transporting the printing paper; an imaging section for capturing an image on the printing paper transported by the transport section; a reading time setting section for determining, in accordance with a transport operation of the printing paper, a reading time during which the imaging section reads an image of the color chart; an image data storage section for storing image data on an area read by the imaging section during the reading time, as readout image data; a color chart actual position calculation section for calculating an actual position in which each of the color chart fields was actually printed, on the basis of the readout image data; and a color chart information determination section for determining color chart information about each of the color chart fields from the readout image data corresponding to the actual position.

In the first aspect, the imaging section can read only an area including the color chart, which reduces the amount of image data to be handled. Further, the use of a preset color chart avoids the necessity of preparing a reference image for comparison.

According to a second aspect of the present invention, the printing press of the first aspect further comprises: a printing plate recording section for positioning and recording the color chart on a printing plate, wherein the reading time setting section determines the reading time on the basis of a position in which the color chart was recorded.

In the second aspect, the reading time to read the color chart can appropriately be determined according to the recording position of the color chart in image recording.

According to a third aspect of the present invention, the printing press of the second aspect further comprises: a color chart data adding section for adding color chart data representing the color chart to print image data representing printing matter; and a color chart position computation section for computing a position to which the color chart data was added, on the basis of an image size given by the print image data, wherein the reading time setting section determines the reading time on the basis of the position to which the color chart data was added.

In the third aspect, the position of the color chart is computed in response to an image size given by the image data, which allows proper setting of the reading time responsive to variations in the image size.

According to a fourth aspect of the present invention, the printing press of the first aspect further comprises: a plate cylinder for holding a printing plate; a blanket cylinder with a blanket surface for receiving an ink image from the plate cylinder; an impression cylinder for holding printing paper and receiving an ink image from the blanket cylinder; and an encoder for detecting a rotational position of at least any one of the impression cylinder, the plate cylinder, and the blanket cylinder, wherein the reading time setting section determines the reading time on the basis of a detection signal from the encoder.

In the fourth aspect, the reading time is determined by the encoder for detecting the rotational positions of the cylinders, which eliminates the need for additional means for detecting the position of printing paper.

According to a fifth aspect of the present invention, in the printing press of the fourth aspect, the plate cylinder and the blanket cylinder are double-diameter cylinders each having two print areas, and the impression cylinder is an n-fold diameter cylinder having a n/2-fold diameter of the plate cylinder (where n is a natural number). The printing press feeds and delivers the printing paper for every two turns of the impression cylinder, and further comprises: a paper feed/delivery signal setting section for setting a paper feed/delivery signal that indicates whether or not to feed/deliver the printing paper for each rotation of the impression cylinder, wherein the encoder detects a rotational position of the impression cylinder, and the reading time setting section determines the reading time by determining from the paper feed/delivery signal a time when the printing paper passes under the imaging section and determining from the detection signal from the encoder a position of the printing paper being transported.

In the fifth aspect, even if the printing press feeds printing paper for every plurality of turns of the impression cylinder, the reading time can be determined for only printing paper being transported.

According to a sixth aspect of the present invention, in the printing press of the first aspect, the color chart includes one or more reference marks to specify the position of the color chart, the color chart actual position calculation section calculates the actual position of each of the color chart fields, on the basis of both a position of the reference mark detected according to the readout image data and previously-stored position information about relative positions of the reference mark and each of the color chart fields.

In the sixth aspect, the color chart includes the reference marks, which facilitates detection of the position of the color chart and thereby improves the accuracy of detecting the position of each of the color chart fields.

According to a seventh aspect of the present invention, in the printing press of the sixth aspect, the imaging section includes two line sensors arranged along a direction of print span, each sensor being capable of reading an area on the color chart, the areas to be read by both of the line sensors overlapping each other, and at least one of the reference marks is a common reference mark which is positioned in an overlapping portion of the areas to be read by both of the line sensors and is used in common for reading of the areas.

In the seventh aspect, even when the imaging section is divided into two parts, a common reference mark allows alignment of image data read by each imaging section. This reduces the number of reference marks in the color chart.

According to an eighth aspect of the present invention, in the printing press of the seventh aspect, the image data storage section includes two memories for individually storing two readout image data obtained by the two line sensors, each of the two readout image data being stored in a corresponding one of the memories from the other side of the common reference mark.

In the eighth aspect, image data read by the two imaging sections can be stored in the memories in the same address direction with respect to a common reference mark. Thus, the two image data can be processed according to the same procedure.

A ninth aspect of the present invention is directed to a printing press for printing a color chart having a plurality of color chart fields in a margin of printing paper, said printing press equipped with a color chart measuring apparatus for reading each of the color chart fields on the printing paper to measure color chart information. The printing press comprises: a measuring area setting section for determining an area in which the color chart is located on the printing paper as a measuring area; a paper stack section for stacking the printing paper printed; a rough positioning section for roughly positioning the printing paper stacked in the paper stack section; an imaging section for reading an image on the printing paper; an image data storage section for storing, out of readout image data obtained by the imaging section, at least readout image data on an area determined by the measuring area setting section; a color chart actual position calculation section for calculating an actual position of each of the color chart fields on the basis of the readout image data; and a color chart information determination section for determining color chart information about each of the color chart fields from the readout image data corresponding to the actual position.

In the ninth aspect, reading is performed on delivered printing paper at rest, which eliminates the need for a mechanism for stabilizing the transportation of printing paper for reading.

A tenth aspect of the present invention is directed to a printing press for doing printing using a printing plate on which an image is recorded. The printing press comprises: a color chart data storage section for storing color chart data representing a color chart; a color chart data adding section for adding the color chart data to print image data; a printing plate recording section for recording the image on the printing plate on the basis of the print image data obtained by the addition of the color chart data; a color chart position computation section for computing a position to which the color chart data was added; a printing section for printing a print image and the color chart on printing paper by using the printing plate; an image data acquisition section for acquiring image data on an area including the color chart on the printing paper on the basis of the position to which the color chart data was added; and a color chart information determination section for determining color chart information about each of color chart fields in the color chart on the basis of the image data.

In the tenth aspect, image data on an area including the color chart can be obtained on the basis of the position of the color chart in image recording, which allows proper color chart measurement.

An eleventh aspect of the present invention is directed to a color chart measuring apparatus for capturing an image on printing paper on which a color chart having a plurality of color chart fields was printed and measuring color chart information. The measuring apparatus comprises: an imaging section for reading an image on the printing paper being transported; a reading time setting section for determining, in accordance with a transport operation of the printing paper, a reading time during which the imaging section reads an image of the color chart; an image data storage section for storing image data on an area read by the imaging section during the reading time, as readout image data; a color chart actual position calculation section for calculating an actual position in which each of the color chart fields was actually printed, on the basis of the readout image data; and a color chart information determination section for determining the color chart information about each of the color chart fields from the readout image data corresponding to the actual position.

In the eleventh aspect, the imaging section can read only an area including the color chart, which reduces the amount of image data to be handled. Further, the use of a preset color chart avoids the necessity of preparing a reference image for comparison.

According to a twelfth aspect of the present invention, in the color chart measuring apparatus of the eleventh aspect, the reading time setting section acquires position information about the color chart from an image recording apparatus for recording the color chart on a printing plate, and determines the reading time on the basis of the position information.

In the twelfth aspect, the reading time to read the color chart can appropriately be determined according to the recording position of the color chart in image recording.

A thirteenth aspect of the present invention is directed to a color chart measuring method for use in a printing process for recording a print image and a color chart having a plurality of color chart fields on a printing plate and printing the color chart in a margin of printing paper by using the printing plate. The measuring method comprises the steps of: computing a position of the color chart relative to the print image; determining an area to capture an image of the color chart on the basis of the position of the color chart; imaging the area on the printing paper; storing readout image data obtained through imaging; computing an actual position of each of the color chart fields from the readout image data; and determining color chart information on the basis of the readout image data corresponding to the actual position.

In the thirteenth aspect, the reading time to read the image data can be determined from the position of the color chart relative to the print image, which reduces the amount of image data to be read.

A fourteenth aspect of the present invention is directed to a color chart measuring method for use in a printing process for recording a print image and a color chart having a plurality of color chart fields on a printing plate and printing the color chart in a margin of the printing paper by using the printing plate. The measuring method comprises the steps of: computing a position of the color chart relative to the print image; capturing an image on the printing plate; determining an area in which the color chart is located, on the basis of the position of the color chart; out of readout image data obtained through imaging, specifying readout image data on the area in which the color chart is located; computing an actual position of each of the color chart fields on the basis of the specified readout image data; and determining color chart information from the readout image data corresponding to the actual position.

In the fourteenth aspect, image data on only an area including the color chart can be determined from the position of the color chart relative to the print image, which reduces the amount of image data to be handled in image processing.

According to a fifteenth aspect of the present invention, in the printing press of the first aspect, the color chart is provided along a width of the printing paper for checking at least an ink density in the printing press, the color chart includes: at least two reference marks located at a predetermined distance from each other in a direction of a print span; and a plurality of kinds of color chart fields provided in a line between the reference marks, wherein the reference marks have a pattern to indicate positions of the color chart fields with respect to a print direction.

In the fifteenth aspect, a tilt of the color chart imaged can be corrected by using at least two reference marks, which is effective when making color chart measurement while transporting printing paper. Since the reference marks each have a pattern to indicate the positions of the color chart fields with respect to the print direction, the detection of the reference marks facilitates the specification of the position of the color chart.

A sixteenth aspect of the present invention is directed to a color chart measuring method for capturing an image of a color chart having a plurality of color chart fields on printing paper and measuring color chart information on the basis of image data obtained through imaging, wherein color data corresponding to each of the color chart fields is computed from image data on each of the color chart fields, and white color data corresponding to each of the color chart fields is computed from image data on an unprinted area in the close vicinity of each of the color chart fields; and in determining the color chart information on the basis of the image data on each of the color chart fields, a correction is made to the color data on each of the color chart fields on the basis of corresponding one of the white color data.

In the sixteenth aspect, white color correction can be made on the basis of image data on an unprinted area corresponding to each of the color chart fields. This allows a correction to be made on a difference in the imaging level which is caused by flapping or the like of printing paper.

According to a seventeenth aspect of the present invention, in the color chart measuring method of the sixteenth aspect, imaging of the color chart is carried out while the printing paper is being transported.

This is especially suitable for making color chart measurement while transporting printing paper.

According to an eighteenth aspect of the present invention, in the color chart measuring method of the seventeenth aspect, imaging of the color chart is carried out by means of an imaging section including a plurality of imaging devices, the imaging section reads a white reference object which was positioned at a standstill before the imaging of the color chart and uses the white reference object to make a shading correction on the image data.

In the eighteenth aspect, shading correction is made on the basis of a white reference object at a standstill, which improves the accuracy of color chart measurement.

A nineteenth aspect of the present invention is directed to a color chart provided along a width of printing paper for checking at least an ink density in a printing press. The color chart includes: at least two reference marks provided at a predetermined distance from each other in a direction of a print span; and a plurality of kinds of color chart fields arranged in line between the reference marks, the reference marks each have a pattern to indicate positions of the color chart fields with respect to a print direction.

In the nineteenth aspect, a tilt of the color chart imaged can be corrected by using at least two reference marks, which is effective when making color chart measurement while transporting printing matter. Since the reference marks each have a pattern to indicate the positions of the color chart fields with respect to the print direction, the detection of the reference marks facilitates the specification of the position of the color chart.

According to a twentieth aspect of the present invention, in the color chart of the nineteenth aspect, an unprinted area is formed adjacent to the color chart fields on the printing paper, and the reference marks each further has a pattern to indicate a range of the unprinted area.

In the twentieth aspect, a white reference can be produced from an unprinted area. Further, since the reference marks each have a pattern to indicate the range of the unprinted area, the detection of the reference marks facilitates the specification of the position of the unprinted area.

According to a twenty-first aspect of the present invention, in the color chart of the nineteenth aspect, of the at least two reference marks, two reference marks are provided at about both ends of the printing paper across the width of the printing paper.

In the twenty-first aspect, the reference marks are provided at about both ends of printing paper across the width, which improves the accuracy of tilt correction.

According to a twenty-second aspect of the present invention, in the color chart of the nineteenth aspect, some of the plurality of kinds of color chart fields are arranged on both sides of any one of the at least two reference marks in symmetry with respect to a point about the any one reference mark.

In the twenty-second aspect, the color chart fields are arranged symmetrically with respect to a point about a reference mark. Using that reference mark as a reference therefore facilitates calculation of the positions of the respective color chart fields.

According to a twenty-third aspect of the present invention, in the color chart of the nineteenth aspect, the color chart fields are of multiple colors (YMCK), and the reference marks are of a single black (K) color.

In the twenty-third aspect, since the reference marks are of a single black color, it is easy to detect or visually recognize the positions of the reference marks.

A twenty-fourth aspect of the present invention is directed to a color chart measuring method for measuring the color chart of the nineteenth aspect, comprising the steps of: obtaining image data by imaging an area including the color chart on the printing paper; computing positions of the reference marks from the image data; computing a position of each of the color chart fields on the basis of the positions of the reference marks; and measuring each of the color chart fields on the basis of the position of each of the color chart fields, wherein a tilt of the image data obtained by reading the color chart is corrected on the basis of the positions of the at least two reference marks.

In the twenty-fourth, a tilt of the color chart imaged can be corrected by using at least two reference marks. This is especially effective for a tilt of printing paper due to transportation, when color chart measurement is made while printing matter is being transported.

According to a twenty-fifth aspect of the present invention, in the color chart measuring method of the twenty-fourth aspect, when the color chart includes three or more reference marks, imaging is carried out by using a different line sensor for every two adjacent reference marks out of the three or more reference marks.

In the twenty-fifth aspect, even when a plurality of line sensors divide the color chart for measurement, each of the sensors can make tilt correction by using two reference marks.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6D are explanatory diagrams for the structure of a color chart;

DESCRIPTION OF THE PREFERRED EMBODIMENTS

[Preferred Embodiments of Color Chart]

Figure 1:
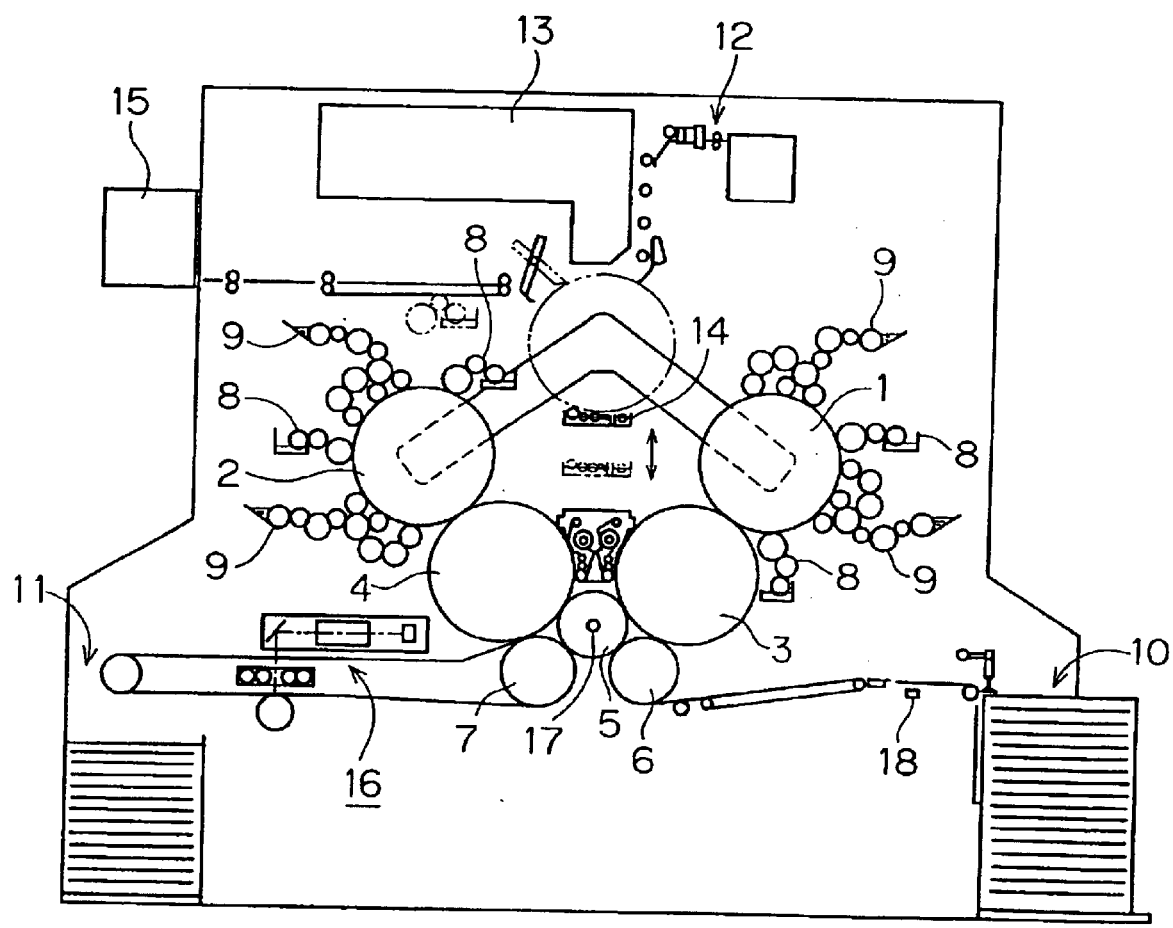
FIG. 1 is a schematic side view showing an example of a printing press according to the present invention.

First of all, the structure of a color chart used in the present invention will be set forth. FIGS. 6A to 6D are explanatory diagrams showing a concrete example of a color chart according to the present invention. Referring to FIG. 6A, an image (im) representing printing matter and a color chart (cc) are printed on printing paper S, the color chart (cc) being located along the rear end of the image (im) with respect to a print direction. The image (im) on the printing paper S is positioned a predetermined gripper margin (f) apart from the leading edge (gripper end) of the printing paper S. Where (m) is the size of the image (im) (in the print direction), (r) is the width of the color chart (cc), and the leading edge of the printing paper S is an origin point, the area where the color chart (cc) is to be located is in the range from a point at a distance of ((f)+(m)) from the original point to a point at a distance of ((f)+(m)+(r)) from the original point, with respect to a print direction. Since the width (r) of the color chart (cc) to be used is predetermined and the gripper margin (f) is a preset known value, if the size (m) of the image (im) is known, the area where the color chart (cc) is to be located can be computed therefrom.

FIG. 6B shows a concrete example of the color chart (cc). The color chart (cc) is a pattern in which a plurality of color chart fields (cr) and reference marks (rm1) to (rm3) (generically referred to as "(rm)") provided among the color chart fields (cr) are linearly arranged along a direction of print span. The color chart fields (cr) are a predetermined repetitive sequence of halftone fields of a predetermined color density and solid fields for each color. By measuring each color chart field to calculate a solid color density and a dot percentage and comparing the calculated values with preset values, an excess and deficiency of the ink feed can be found. The color chart fields (cr) are arranged symmetrically with respect to a point, about the reference mark (rm1) which is a common reference mark.

FIG. 6C is an enlarged view of one reference mark (rm). In this preferred embodiment, the reference mark (rm) is a register mark printed in a single color of black (K), which consists of two bars (b) having a predetermined length in the print direction and a cross mark (d) provided between those bars (b). The horizontal line of the cross mark (d) is positioned at about half the height of the color chart fields (cr) (cf. α in the drawing) and therefore, the positions of the color chart fields (cr) with respect to the print direction can be determined from the reference marks (rm). White color fields (hr) (cf. FIG. 6B) to be unprinted areas exist immediately above the color chart fields (cr), and the lengths of the bars (b) are determined to extend into the white color fields (hr) beyond the width of the color chart fields (cr). Thus, an area with respect to the print direction, in which only the bars (b) are detected without the cross mark (d), can be considered to be within the range of the white color fields (hr). In this preferred embodiment, the reference mark (rm1) is located at the center of the color chart (cc), and the reference marks (rm2) and (rm3) are located at about both ends of the color chart (cc).

[First Preferred Embodiment]

In the following description, a printing press according to the present invention will be set forth with reference to the drawings. FIG. 1 is a schematic side view showing an example of the printing press according to the present invention. As shown in FIG. 1, the printing press, as a printing mechanism, comprises first and second plate cylinders 1 and 2 for holding printing plates; first and second blanket cylinders 3 and 4 for transferring ink images from the plate cylinders 1 and 2, respectively; an impression cylinder 5 for holding printing paper on which ink images are to be transferred from both the blanket cylinders 3 and 4; a feeding cylinder 6 and a sheet delivery cylinder 7 for feeding and delivering printing paper to and from the impression cylinder 5, respectively; dampening-water supply sections 8 and ink supply sections 9 for supplying dampening water and ink, respectively, to the printing plates on the first and second plate cylinders 1 and 2; a paper feeding section 10 for successively feeding unprinted sheets of paper from a paper stack; and a sheet delivery section 11 for successively stacking up printed sheets of paper.

The printing press, as a plate making mechanism, further comprises a printing plate supply section 12 for feeding unexposed printing plates to the first and second plate cylinders 1 and 2; an image recording section 13 for recording an image on the printing plates on the plate cylinders 1 and 2; a developing section 14 for developing printing plates on which images have been recorded; and a printing plate ejection section 15 for ejecting used printing plates. The printing press still further comprises an imaging section 16 for capturing an image on a printed sheet of paper; an encoder 17 for detecting the rotational position of the impression cylinder 5; and a sheet sensor 18 for detecting printing paper fed from the paper feeding section 10.

Now, each of the aforementioned sections will be discussed in more detail. The first plate cylinder 1 is configured to be movable between a first printing position indicated by the solid line in FIG. 1 and an image recording position indicated by the two-dot chain line, by means of a plate cylinder drive mechanism. Similarly, the second plate cylinder 2 is configured to be movable between a second printing position indicated by the solid line in FIG. 1 and the image recording position indicated by the two-dot chain line, by means of a plate cylinder drive mechanism. That is, the first and second plate cylinders 1 and 2 are located respectively in the first and second printing positions during printing operations, whereas they are located in the image recording position by turns during prepress operations for making printing plates on the respective plate cylinders 1 and 2. The first and second plate cylinders 1 and 2 each have a peripheral surface that can hold printing plates for two colors and each comprise grippers for fixing printing plates on the peripheral surface at diametrically opposed positions.

The first blanket cylinder 3 is configured to be rotatable in contact with the first plate cylinder located in the first printing position, and similarly the second blanket cylinder 4 is configured to be rotatable in contact with the second plate cylinder 2 located in the second printing position. The first and second blanket cylinders 3 and 4 have the same diameter as the first and second plate cylinders 1 and 2 and they have blankets on their peripheral surfaces. The blanket allows the transfer of two colors of ink images from each of the plate cylinders 1 and 2.

The impression cylinder 5 has half the diameter of the first and second plate cylinders 1 and 2 and is configured to be rotatable in contact with both the first and second blanket cylinders 3 and 4. The impression cylinder 5 comprises a gripper that can hold a single sheet of printing paper of a size about equal to the size of the printing plates. This gripper is opened and closed in predetermined timed relation by means of a switching mechanism, so that it can grip the leading edge of printing paper. In this preferred embodiment, the impression cylinder 5 includes the coaxial encoder 17, which can detect the rotational position of the impression cylinder 5. Such an encoder 17 is generally provided for controlling the rotational position of the impression cylinder 5, and in the present invention, it is used for detecting the current position of printing paper being transported.

The feeding cylinder 6 and the sheet delivery cylinder 7 have the same diameter as the impression cylinder 5 and each comprise a gripper similar to that of the impression cylinder 5. The gripper of the feeding cylinder 6 is located so that it can transfer printing paper in synchronization with the gripper of the impression cylinder 5, while the gripper of the sheet delivery cylinder 7 is located so that it can receive printing paper in synchronization with the gripper of the impression cylinder 5.

The first and second plate cylinders 1 and 2 located respectively in the first and second printing positions, the first and second blanket cylinders 3 and 4, the impression cylinder 5, the feeding cylinder 6, and the sheet delivery cylinder 7, each have at its end a drive gear of the same diameter as itself. The gears of the cylinders which are in contact are in engagement. By driving those gears by means of a print drive motor, the respective cylinders can be rotatably driven in synchronization with one another. In the printing press of the present invention, the plate cylinders 1 and 2 and the blanket cylinders 3 and 4 have double the perimeter of the impression cylinder 5; therefore, the impression cylinder 5 is rotated two turns during one rotation of the plate cylinders 1 and 2 and the blanket cylinders 3 and 4. Thus, turning the impression cylinder 5 with printing paper two turns achieves multi-color printing in four colors, each two colors from the respective first and second plate cylinders 1 and 2.

The dampening-water supply sections 8 are provided in pairs for each of the plate cylinders 1 and 2 which are located respectively in the first and second printing positions, and they can selectively supply dampening water to two printing plates on each of the plate cylinders 1 and 2. The dampening-water supply sections 8 each comprise a water pan for storage of dampening water and a group of dampening-water feed rollers for pumping dampening water from the water pan and transferring it to the printing plate surface. Of the dampening-water feed rollers, at least those which are in contact with the printing plate surface are configured so that they can be brought into contact with or away from the surfaces of the plate cylinders 1 and 2 by means of a cam mechanism. If the printing plate is of a type that requires no damping water, the dampening-water supply sections 8 become unnecessary.

The ink supply sections 9 are provided in pairs for each of the plate cylinders 1 and 2 which are located respectively in the first and second printing positions, and they can selectively supply different color inks to two printing plates on each of the plate cylinders 1 and 2. The ink supply sections 9 each comprise an ink fountain which can control the ink feed for each of a plurality of areas arranged along the direction of print span, and a plurality of ink rollers for kneading ink given from the ink fountain and applying it to the printing plate surface. Of the ink rollers, at least those which are in contact with the printing plate surface are configured so that they can be brought into contact with or away from the surfaces of the plate cylinders 1 and 2 by means of a cam mechanism. For example, black-ink (K) and magenta-ink (M) supply sections 9 may be located for the first plate cylinder 1, while cyan-ink (C) and yellow-ink (Y) supply sections 9 may be located for the second plate cylinder 2. Some of the dampening-water supply sections 8 and the ink supply sections 9 are configured so that they can move away from the paths of travel of the first and second plate cylinders 1 and 2 in accordance with the movements of those cylinders 1 and 2.

The paper feeding section 10 picks up a single sheet of printing paper at a time from a pile of unused printing paper and transfers it to the feeding cylinder 6. In this preferred embodiment, the paper feeding section 10 operates to feed a single sheet of printing paper for every two turns of the feeding cylinder 6. The paper feeding section 10 comprises the sheet sensor 18 for optically detecting the passage of printing paper. Such a sheet sensor 18 is generally provided for detecting a paper jam or multiple sheet intake, and in this preferred embodiment, the result of detection by the sheet sensor 18 is used to determine whether or not to feed a sheet of printing paper to the impression cylinder 5 or the feeding cylinder 6. The sheet delivery section 11 receives printed sheets of paper from the sheet delivery cylinder 7 and stacks them up. The details of the sheet delivery section 11 will later be described in conjunction with a configuration of the imaging section 16.

Next, the plate making mechanism of this printing press will be set forth. In the prepress operation, the printing press moves the first and second plate cylinders 1 and 2 by turns to the image recording position. In the image recording position, a friction roller is rotatably driven in contact with the plate cylinder 1 or 2.

The printing plate supply section 12 comprises a light-shielding cassette roll for storing a roll of unexposed printing plate, a transport roller and a transport guide for transporting a pulled-out printing plate to the plate cylinder 1 or 2, and a cutter for cutting the printing plate into sheets. In this preferred embodiment, a silver photosensitive material is used for the printing plate, which records an image with laser. In the operating procedure for feeding a printing plate, the leading edge of a pulled-out printing plate from the cassette roll is gripped by one gripper of the plate cylinder 1 or 2, and in this condition, the plate cylinder 1 or 2 is rotated to wind the printing plate onto the plate cylinder 1 or 2. The printing plate is then cut into a predetermined length and the rear edge of the printing plate is gripped by the other gripper of the plate cylinder 1 or 2.

The image recording section 13 records the image (im) and the color chart (cc) by exposing a printing plate to laser light by on-off control. In this preferred embodiment, a polarizer such as a polygon mirror is used to scan the printing plate surface along the axis of the plate cylinder 1 or 2 (the main scanning direction) with laser light emitted from a laser source, while a sub-scan of the printing plate is made by rotating the plate cylinder 1 or 2. The scan method may be in such a form that by providing a plurality of laser light sources along the axis of the plate cylinder 1 or 2, a main scan is conducted with the rotation of the plate cylinder 1 or 2. The printing plate and the image recording section 13 may record images through thermal processing or discharge machining, instead of by exposure to light.

The developing section 14 develops a printing plate exposed in the image recording section 13. In this preferred embodiment, the developing section 14 is configured to perform the development process by pumping out a processing fluid from a processing bath by means of a spreading roller and applying it to the printing plate. The developing section 14 includes an elevator for moving the developing section 14 between a position away from the plate cylinder 1 or 2 and a position adjacent to the plate cylinder 1 or 2. The adoption of an image recording method that requires no development process can eliminate the need for the developing section 14.

This printing press performs the prepress operation by moving the first and second plate cylinders 1 and 2 by turns to the image recording position, feeding printing plates, and carrying out image recording and development. Upon completion of the prepress operation, the first and second plate cylinders 1 and 2 are placed back into the first and second plating positions, respectively, for the printing operation.

Also, this printing press can automatically eject printing plates after the completion of the printing operation. The printing plate ejection section 15 in this preferred embodiment includes a plate separator for separating printing plates from the plate cylinder 1 or 2 located in the image recording position, a conveyor for conveying the separated printing plates, and an ejection cassette for ejecting the conveyed, used printing plates.

Figure 2:
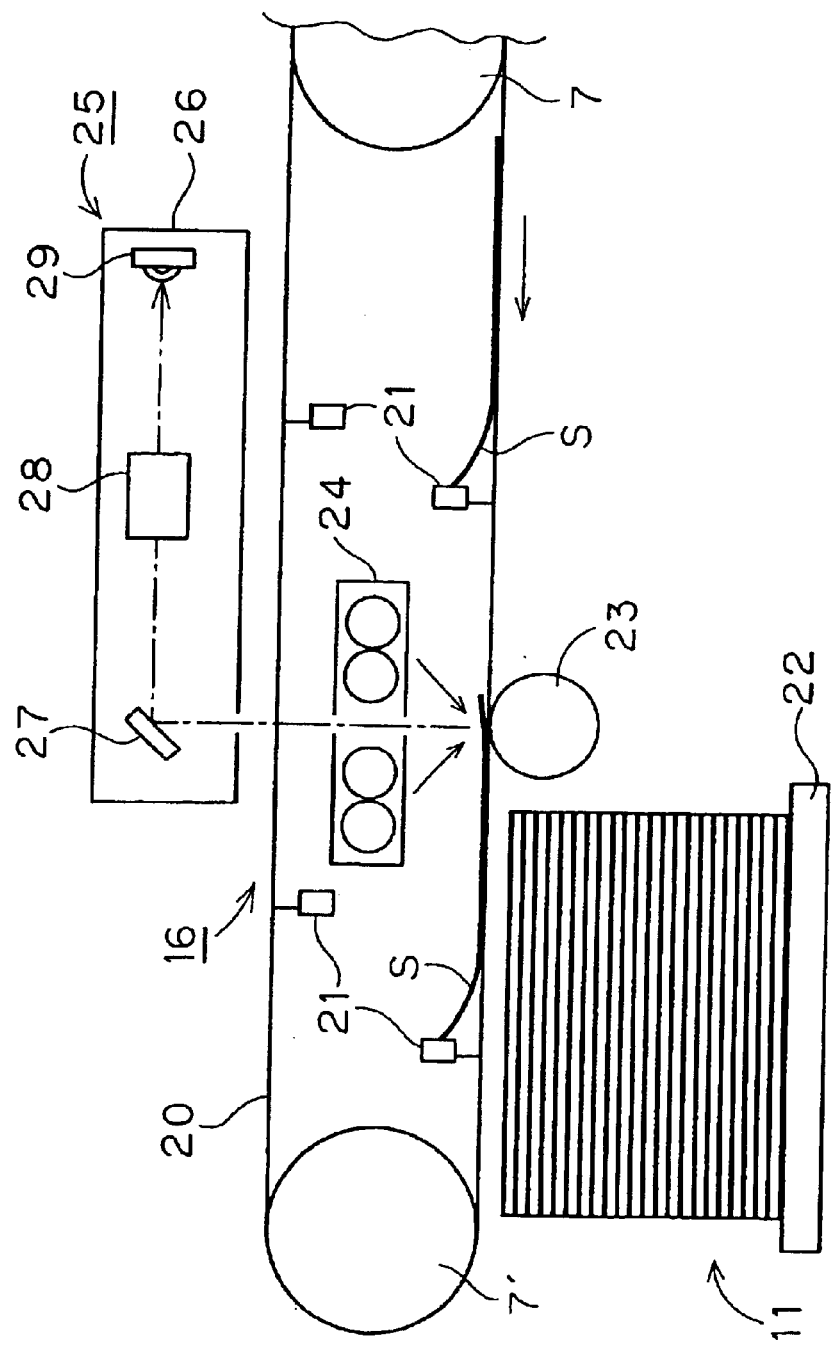
FIG. 2 is a schematic side view showing a sheet delivery section and an imaging section in the printing press.

Referring now to FIG. 2, configurations of the imaging section 16 and the sheet delivery section 11 according to the present invention will be set forth. FIG. 2 is a schematic side view in the vicinity of the sheet delivery section 11. The sheet delivery section 11 comprises the sheet delivery cylinder 7, two endless chains 20 looped around two gears 7' of about the same diameter as the sheet delivery cylinder 7 (the gears 7' are arranged in a direction perpendicular to the plane of FIG. 2), a plurality of grippers 21 which are conveyed on the two chains 20 for transportation of printing paper S, and a paper output tray 22 for stacking up the printing paper S transported by the grippers 21.

The sheet delivery cylinder 7 has at its both ends, gears each being in engagement with a respective one of the chains 20 and opposed to a respective one of the two gears 7' of about the same diameter as the sheet delivery cylinder 7. The endless chains 20 are looped around the gears of the sheet delivery cylinder 7 and the gears 7'. The length of the chains 20 is set to be an integral multiple of the perimeter of the sheet delivery cylinder 7.

The plurality of grippers 21, each having a enclosable pawl member for gripping the leading edge of the printing paper S, are secured to run between the two chains 20. The spacing between each of the grippers 21 on the chains 20 equals to the perimeter of the sheet delivery cylinder 7. The grippers 21 are structured to be opened and closed by means of a cam mechanism in synchronization with the grippers of the sheet delivery cylinder 7 and thereby to receive the printing paper S from the sheet delivery cylinder 7 and transport the printing paper S onto the paper output tray 22 with the rotation of the chains 20.

The paper output tray 22 is of a pallet member that can load sheets of printing paper S and is vertically movable by means of an elevator. As more printing paper S is stacked, the paper output tray 22 successively descends to keep the height of a stack of printing paper S constant and thereby allows smooth delivery of the printing paper S.

The sheet delivery section 11 transports the printing paper S with its grippers 21 gripping the leading edge of the printing paper S and thus, the rear edge of the printing paper S is not secured during transportation. This causes flapping of the printing paper S during transportation. To prevent such flapping of the printing paper S, this preferred embodiment provides a suction roller 23 ahead of the paper output tray 22 to stabilize the transportation of the printing paper S.

The suction roller 23 has a number of microscopic suction holes on the surface and is connected to a vacuum pump. The suction roller 23 is located such that its roller axis is parallel to the grippers 21 running between the two chains 20 and its top portion is at about the same height as the lower runs of the chains 20. The suction roller 23 is configured to be either rotatably driven with the running speed of the grippers 21 or only freely rotatable. The printing paper S being transported is thus pressed over the surface of the suction roller 23 when running over the suction roller 23 and will not flap over the suction roller 23. Instead of the suction roller 23, a suction plate member which can secure the surface of the printing paper S by suction may be used.

The imaging section 16 comprises a lighting unit 24 for illuminating printing paper S being transported and an imaging unit 25 for capturing an image on the illuminated printing paper S to obtain image data. The lighting unit 24 is located between the upper and lower runs of the chains 20 along the suction roller 23 and has a plurality of linear light sources for illuminating the printing paper S running over the suction roller 23. There is a slit for imaging in the middle of the light sources.

The imaging unit 25 includes a lightproof and dustproof casing 26 and a mirror 27, a lens 28, and a CCD line sensor 29 located in the casing 26. The imaging unit 25 captures an image on the printing paper S running over the suction roller 23 through the slit in the lighting unit 24, wherein incident light from the image, reflected by the mirror 27, enters the CCD line sensor 29 through the lens 28. The CCD line sensor 29 reads an image for each of three RGB colors. In this preferred embodiment, an image on the printing paper S is sequentially read line by line with the transportation of the printing paper S.

Figure 5:
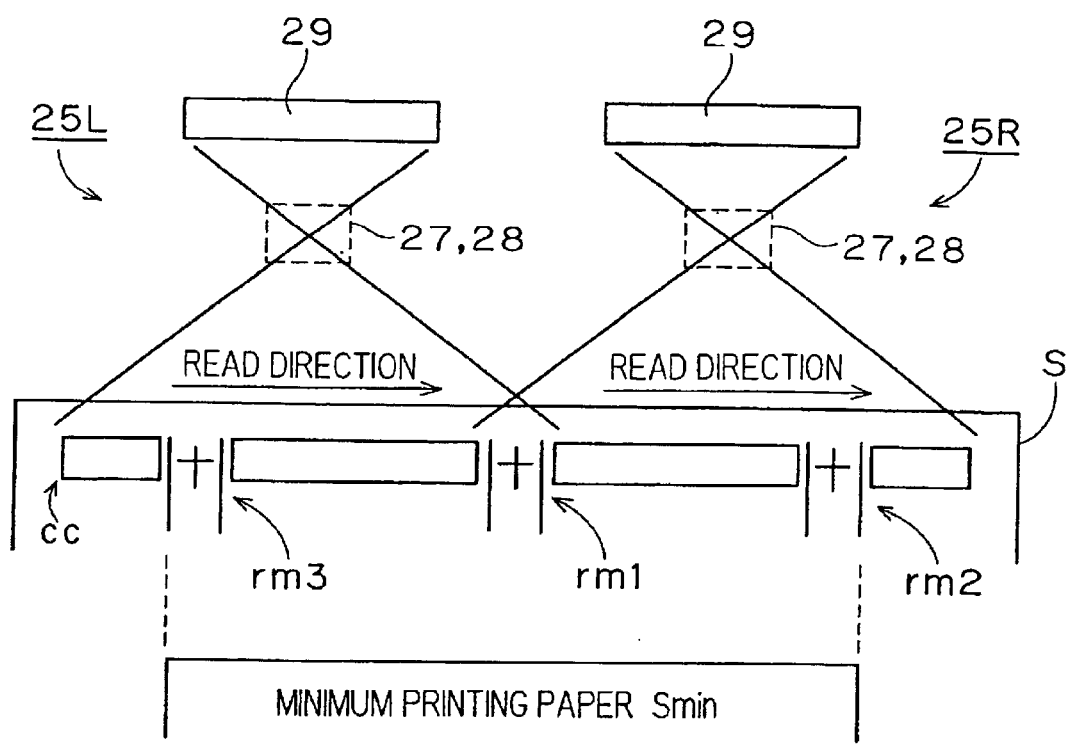
FIG. 5 is an explanatory diagram of the relative positions of the imaging section and reference marks in a color chart.

In this preferred embodiment, the imaging unit 25 includes two imaging units which are arranged in a direction perpendicular to the plane of FIG. 2 and configured to divide an image into two along the width of the printing paper S for imaging. This configuration will now be described with reference to FIG. 5. FIG. 5 is an explanatory diagram of such a configuration in which the two imaging units 25 are arranged along the direction of print span. As shown in FIG. 5, the two imaging units 25R and 25L are arranged to divide the color chart (cc) along the direction of print span for imaging so that their respective CCD line sensors 29 read images in the same direction. Areas to be imaged by the imaging units 25R and 25L overlap at the center of the printing paper S. The reference mark (rm1) is located to lie in a position within the overlapping portion. According to this preferred embodiment, the reference mark (rm1) allows alignment of image data obtained by the two imaging units 25R and 25L.

The reference marks (rm2) and (rm3) are provided at about the both ends of the printing paper S. The imaging unit 25R can image the reference marks (rm1) and (rm2), while the imaging unit 25L can image the reference marks (rm1) and (rm3). Since each of the imaging units 25R and 25L images two reference marks (rm) in this way, the amount of tilt of the color chart (cc) can be found by detecting the positions of the reference marks (rm1) to (rm3). More specifically, if the color chart (cc) printed on the printing paper S has a tilt or paper slippage occurs during transportation, an image of the color chart (cc) in the image data also has a tilt; however, such a tilt can be corrected by detecting the positions of the reference marks (rm1) to (rm3).

For the above tilt correction, it is desirable to locate the reference marks (rm2) and (rm3) as close as possible to the both ends of the printing paper S. In this preferred embodiment, the positions of the reference marks (rm2) and (rm3) are determined according to the minimum width Smin of the printing paper S which can be used in the printing press. This brings the advantage that only the color chart (cc) of a fixed size should be formed at all times irrespective of the size of the printing paper S.

Figure 3:
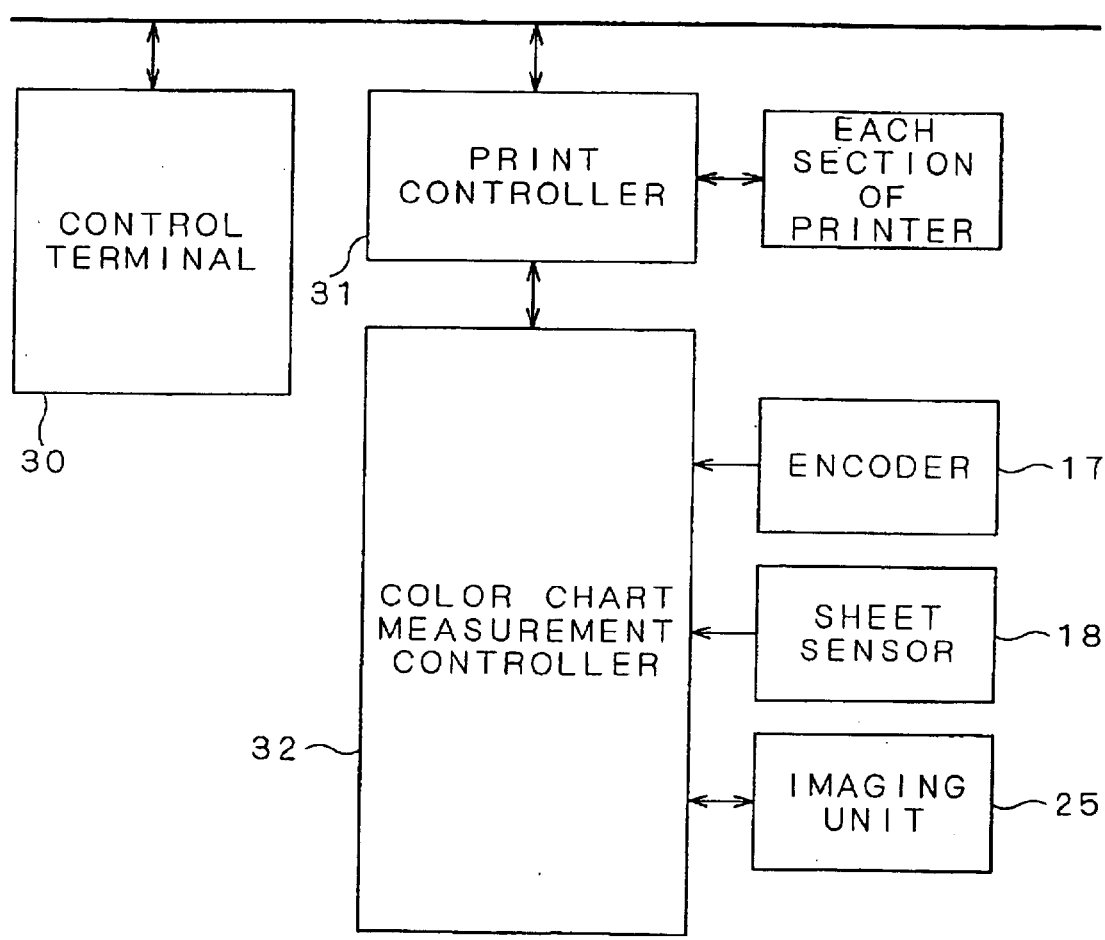
FIG. 3 is a block diagram showing a configuration of a control section in the printing press.
Figure 4:
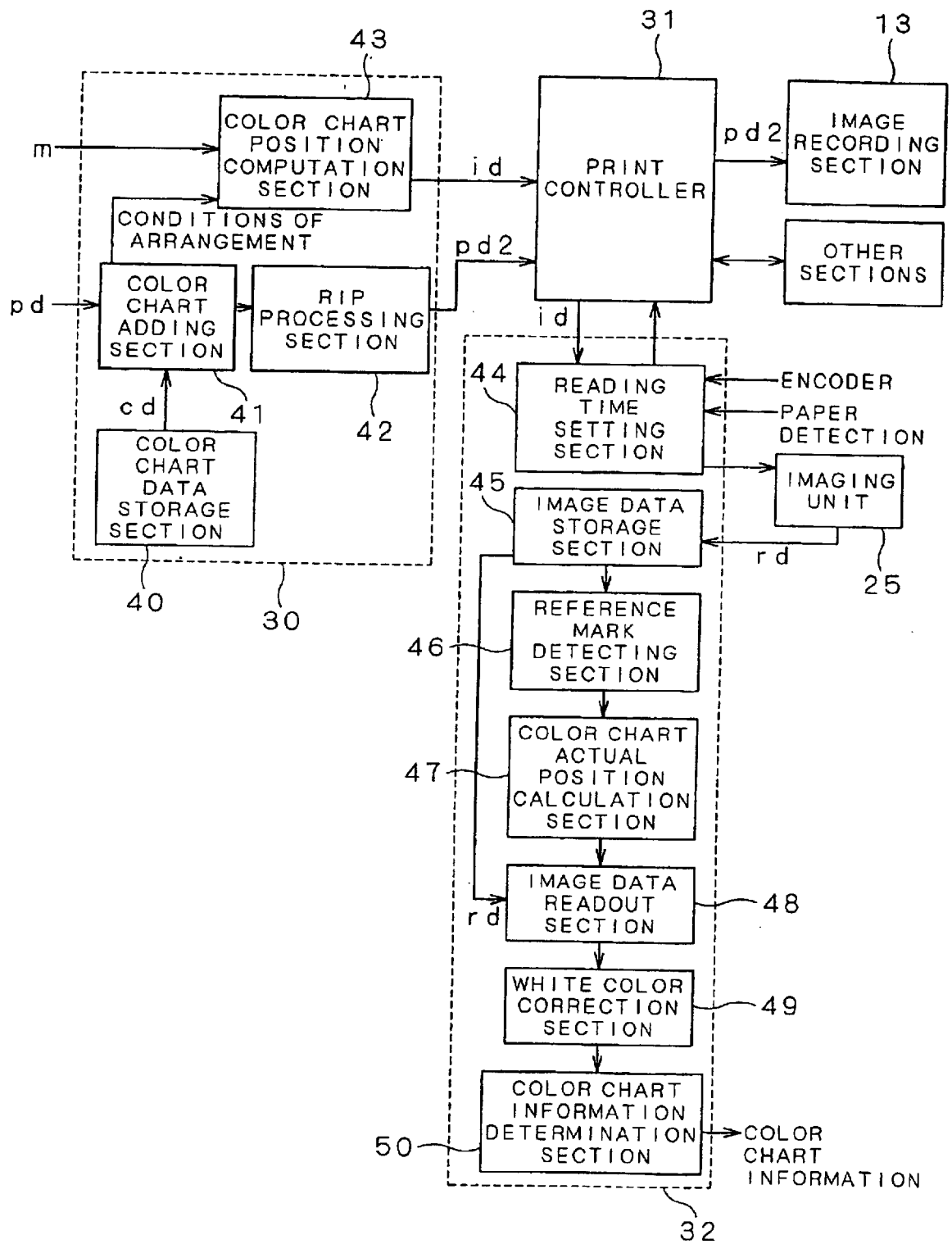
FIG. 4 is a functional block diagram showing the functions of the control section in the block diagram of FIG. 3.

Referring now to FIGS. 3 and 4, the control section in the printing press will be set forth. FIG. 3 is a block diagram of the whole printing press, and FIG. 4 is a functional block diagram showing the functions of each section in the block diagram of FIG. 3. As shown in the block diagram of FIG. 3, the printing press comprises a control terminal 30 for editing image data and directing the printing press to perform printing operations and a print controller 31 for controlling each section of the printing press, both of which are connected through the LAN or the like.

The control terminal 30 is a computer system which comprises a CPU and memory necessary for computations, a display device such as a CRT, an input device such as a keyboard or mouse, and a storage device such as a magnetic disk for storage of various image data and programs, and it is provided outside the main body of the printing press. The control terminal 30 prepares print image data representing printing matter, by directly generating image data or by editing image data received from a separate image data production device.

The print controller 31 is a computer system comprising a CPU substrate and the like, which is provided inside the main body of the printing press. It controls each section of the printing press through various interfaces. A color chart measurement controller 32 for processing image data obtained by the imaging unit 25 and measuring a color chart is configured of a substrate different from the one of the print controller 31 and is connected to the print controller 31. This measurement controller 32, which is also a computer system comprising a CPU substrate and the like, is connected not only to the imaging unit 25 but also to the encoder 17 and the sheet sensor 18 to receive detection signals therefrom.

Referring now to FIG. 4, the functions of the control section according to the present invention will be described. The control terminal 30 comprises a color chart data storage section 40 for storing image data representing a prepared color chart (cc) (such data is hereinafter referred to as "color chart data (cd)"), a color chart adding section 41 for adding the stored color chart data (cd) to print image data (pd), and a RIP processing section 42 for subjecting print image data (pd) obtained by the addition of the color chart data (cd) to RIP processing (raster image processing) to produce binary image data (pd2). In this preferred embodiment, the color chart adding section 41 automatically performs image processing under predetermined conditions of arrangement, e.g., under the condition that the color chart (cc) be added to a position following the rear edge of the print image (im). Alternatively, the position of the color chart (cc) may be determined with manual intervention by an operator. The image data (pd2) produced in the RIP processing section 42 is transferred through the print controller 31 to the image recording section 13.

The control terminal 30 further comprises a color chart position computation section 43 for computing a position to which the color chart (cc) was added. For example under the above condition that the color chart (cc) be added to a position following the rear edge of the print image (im), the color chart position computation section 43 can compute the position of the color chart (cc) on the printing paper S by adding a predetermined gripper margin (f) and an image size (m) of printing matter represented by the print image data (pd). The image size (m) may be determined by the control terminal 30 from the print image data (pd) or may be obtained from the ante-stage image data production device which produced the print image data (pd). The computed position of the color chart (cc) is transferred as color chart position data (id) to the color chart measurement controller 32 through the print controller 31. In the case where the color chart (cc) is located in any desired position by an operator, the color chart position data (id) should be computed from the position of the color chart (cc) relative to the print image data (pd).

The color chart measurement controller 32 comprises a reading time setting section 44 for setting a reading time for the imaging unit 25 on the basis of the color chart position data (id), an image data storage section 45 for storing readout image data (rd) obtained by the imaging unit 25, a reference mark detecting section 46 for detecting the positions of the reference marks (rm) from the readout image data (rd), a color chart actual position calculation section 47 for calculating an actual position of each of the color chart fields (cr) on the basis of the positions of the reference marks (rm) detected, an image data readout section 48 for reading out image data corresponding to the actual position, a white color correction section 49 for making a correction based on readout image data and a white reference of printing paper, and a color chart information determination section 50 for determining color chart information such as a color density and a dot percentage for each of the color chart fields (cr).

The reading time setting section 44 determines a reading time during which the imaging unit 25 reads a read area including the color chart (cc) on the printing paper S, on the basis of the color chart position data (id), an encoder signal from the encoder 17, and a sheet detection signal from the sheet sensor 18. First, the counting of the encoder signal from the encoder 17 indicates in which position the printing paper S is located in the sheet delivery section 11. From the counting of the encoder signal, the reading time setting section 44 determines a time when the read area including the color chart (cc), which was determined according to the color chart position data (id), comes at a reading position of the imaging unit 25, and then directs the imaging unit 25 to start or end a read operation.

The printing press according to the present invention, however, is of a type that feeds and delivers a single sheet of printing paper for every two turns of the impression cylinder 5; therefore, the transportation of the printing paper is actually provided only once for every two turns. In this preferred embodiment, therefore, control is exercised such that by using the sheet detection signal from the sheet sensor 18, imaging is performed only when the printing paper S being transported runs under the imaging unit 25. It should be noted that actual color chart measurement is made for every predetermined number of sampling sheets. As above described, when the sheet detection signal indicates that this rotation of the impression cylinder 5 is the time when the printing paper S runs under the imaging unit 25, the reading time setting section 44 predicts the position of the printing paper S being transported, from the rotational position of the impression cylinder 5 and indicates a reading time to the imaging unit 25. The read area for the imaging unit 25 is determined to be greater in width than the color chart (cc) so that some paper slippage becomes negligible.

On instructions from the reading time setting section 44, the imaging unit 25 reads an image on the printing paper S and readout image data (rd) is stored in the image data storage section 45. The image data storage section 45 includes two memories each corresponding to a respective one of the imaging units 25R and 25L. The readout image data (rd) obtained by the imaging unit 25L is stored from the rear side (i.e., the end address side) of the memory. By so doing, the readout image data rd obtained by the imaging units 25R and 25L can be read through the same procedure. While in the above description, one of the readout image data (rd) is stored from the rear side of the memory, either one of the CCD line sensors 29 may previously be located to read an image in the reverse direction.

The reference mark detecting section 46 detects the reference marks (rm) through image processing on the stored readout image data (rd). Initially, a pixel array pattern at the center of the cross mark (d) between the bars (b) is previously obtained in the reference (rm). FIG. 6D shows an example of such a pixel array pattern at the center of the cross mark (d) in FIG. 6C with respect to the direction α. For ease of understanding, the width of the bars (b), the spacing between each of the bars (b) and the horizontal line of the cross mark (d), and the horizontal line of the cross mark (d) are respectively simply represented by three black pixels, two white pixels, and five black pixels. The reference mark detecting section 46 checks whether the readout image data on the memory includes the pixel array pattern of FIG. 6D by shifting the image data pixel by pixel. Such a method is performed in both X and Y directions, which are perpendicular to each other, on the memory storing the readout image data (rd). Then, the positions at which the pixel array pattern is found are made into a histogram for each of the X and Y directions and the highest point of the histogram can be determined as the position of the reference mark (rm). This method is merely an example of pattern recognition and other methods may be employed as long as the positions of the reference marks (rm) can be determined.

Figure 7:
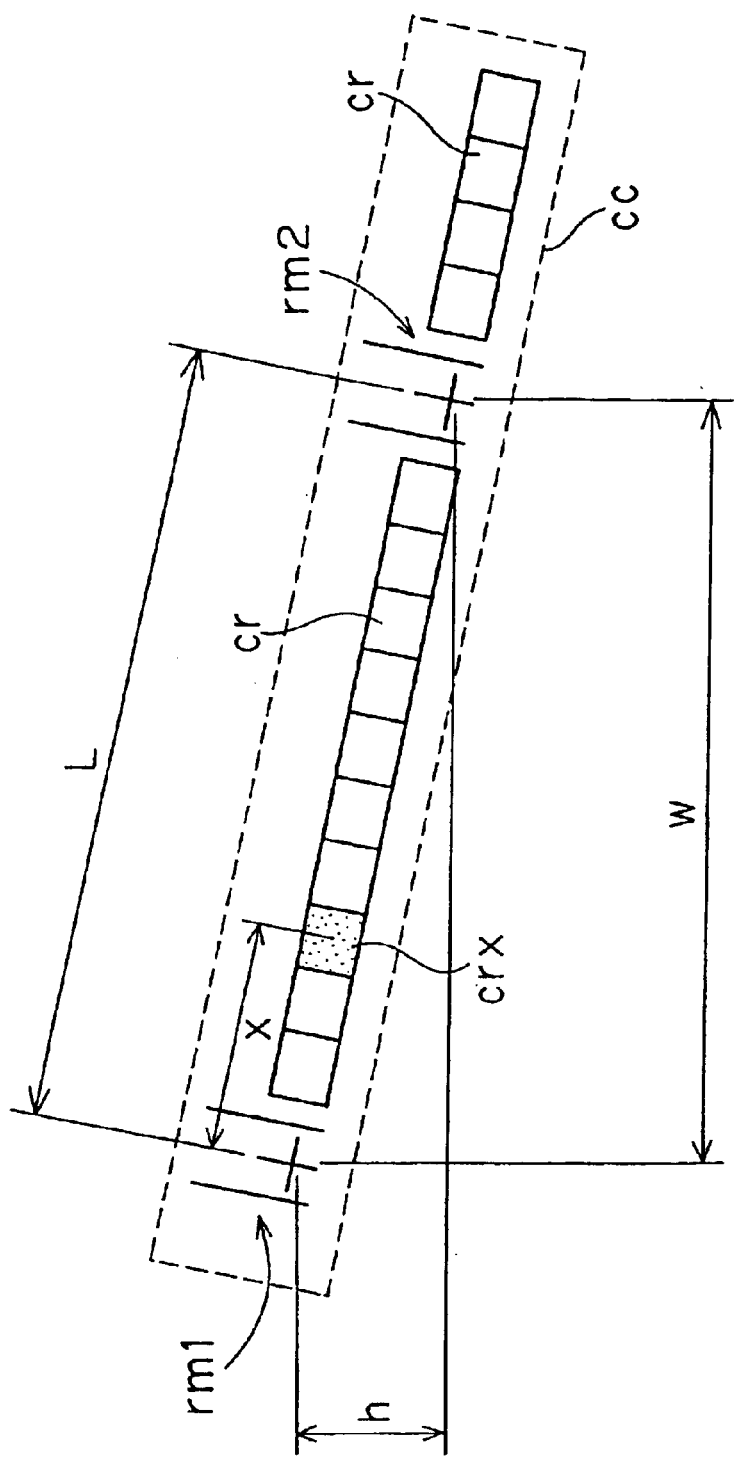
FIG. 7 is an explanatory diagram of tilt correction for a color chart.

From the detected positions of two reference marks (rm), the color chart actual position calculation section 47 computes a distance therebetween. From this, the amount of tilt of the color chart (cc) can be found. FIG. 7 is an explanatory diagram of tilt correction for the color chart (cc). In the example of FIG. 7, (h) indicates a distance between the two reference marks (rm1) and (rm2) in the Y direction (i.e., a deviation in the print direction), (w) indicates a distance therebetween in the X direction (i.e., a distance in a direction of the print span), and L indicates a previously known distance between the reference marks (rm1) and (rm2). Assuming that a target color chart field (crx) is positioned at a known distance (x) from the reference mark (rm1) and the position of the reference mark (rm1) is defined as an origin point, the actual positions of the target color chart field (crx) with respect to the X and Y directions are respectively indicated by (x·w/L) and by (x·h/L) in the readout image data (rd). In this way, a tilt of the color chart (cc) can be corrected by reading at least two reference marks (rm) by the imaging unit 25.

The image data readout section 48 reads image data corresponding to the actual position from the memory. In the present example, image data on a corresponding color chart field (cr) and image data on a white color field (hr) immediately above that color chart field (cr) are read out. The readout of image data is performed in a predetermined microscopic area, i.e., performed by specifying predetermined address space in the memory. In this preferred embodiment, a predetermined read address is controlled in response to the above tilt correction. For instance, in the aforementioned example, (x·w/L) and (x·h/L) are respectively added to X- and Y-direction components of a predetermined read address. The actual position of the white color field (hr) is determined by the bars (b) constituting the reference marks (rm). With respect to the direction of the print span, the white color field (hr) is located in the same position as a corresponding color chart field (cr). With respect to the print direction, the white color field (hr) is within a predetermine range defined by the bars (b). From this, the position of each white color field (hr) can be determined with ease from the relative position of a corresponding color chart field (cr).

The white color correction section 49 produces white color data from readout image data on a white color field (hr) and corrects color data which was calculated from a corresponding color chart field (cr) on the basis of the white color data. Where C1 is the color data, C0 is the white color data, and D is the color density to be found, for example, the color density D is found from D=−k·log(C1/C0) ((k) is the gain coefficient). In this preferred embodiment, for each of the color chart fields (cr), white color data to be a white reference is obtained from a corresponding white color field (hr) adjacent to the color chart field (cr). This brings the advantage of achieving proper color measurements even if flapping of printing paper, for example, causes variations in the imaging level in different parts of the printing paper.

The color chart information determination section 50 determines color chart information other than the color density D, such as a dot percentage, for each of the color chart fields (cr). The color chart information may be converted into ink densities of YMCK based on the color density D obtained, or it may be changed, as necessary, into the amount of opening of an ink key in the ink fountain.

The color chart information obtained in this way is used for control of the supply of dampening water or ink. That is, the color chart measurement controller 32 or the print controller 31 judges an excess and deficiency of the supply of dampening water or ink by comparing the measured color chart information with preset reference values, thereby to provide an adequate supply of ink or dampening water.

Figure 8A:
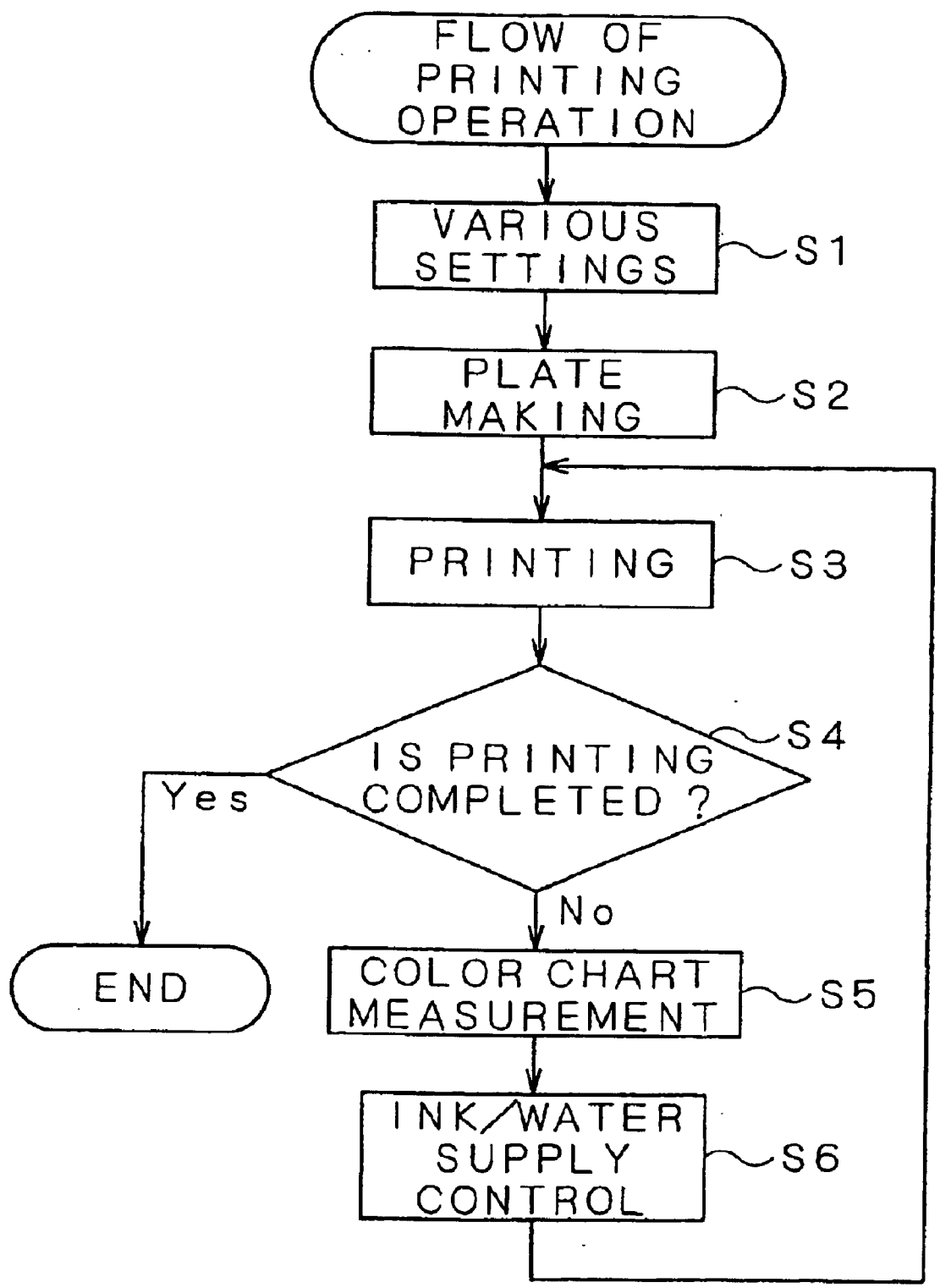
FIGS. 8A and 8B are flowcharts showing the operations of the printing press.
Figure 8B:
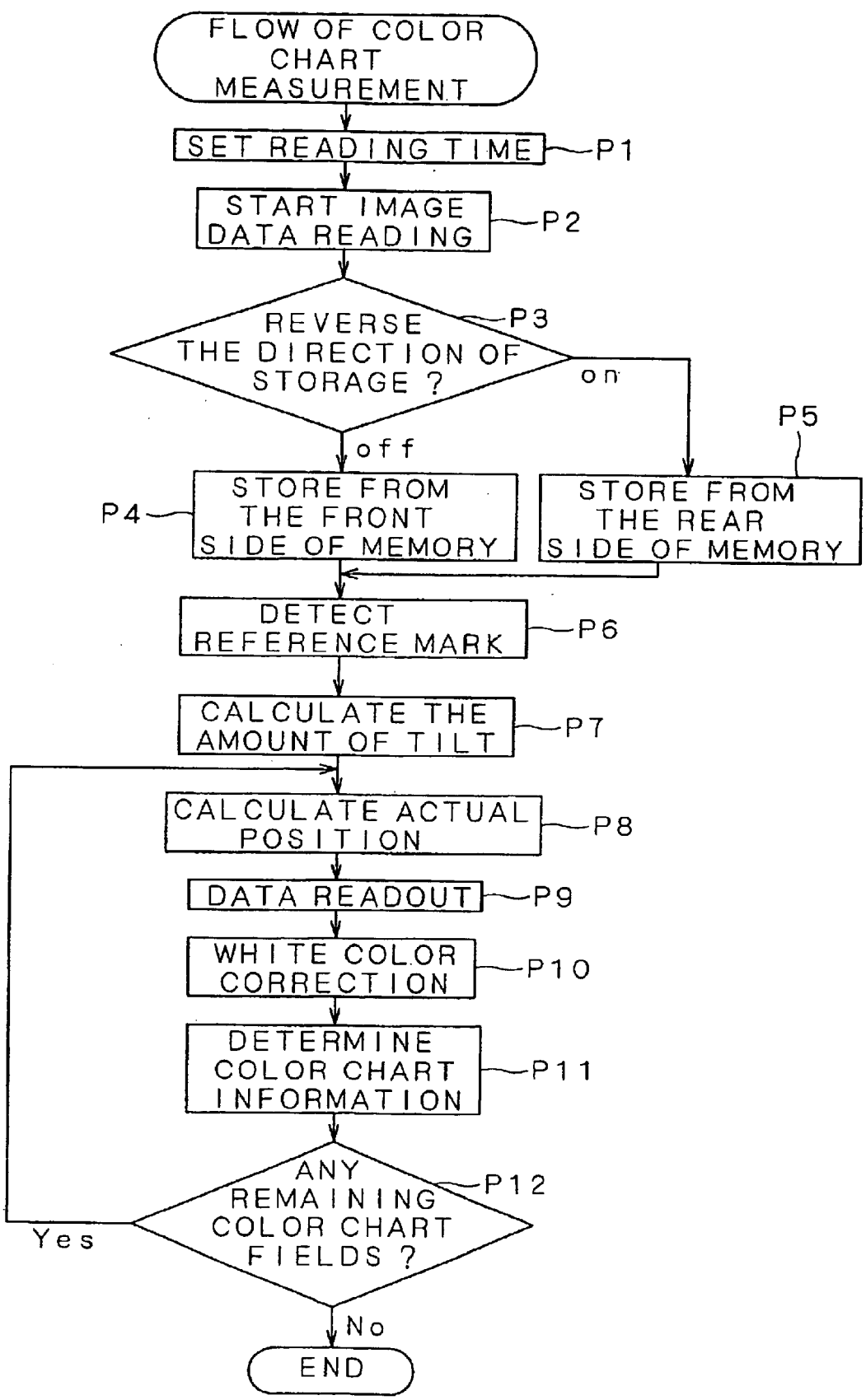

Next, the operations of the printing press according to this preferred embodiment will be described with reference to the flowcharts of FIGS. 8A and 8B. FIG. 8A is a flowchart showing the whole process of a printing operation, and FIG. 8B is a flowchart showing the process of color chart measurement. Referring to FIG. 8A, in the printing operation, various settings are made in step S1. This includes, for example, the specification of print image data (pd) to be used and the setting of the number of sheets to be printed. Here, color chart data (cd) is previously added to the print image data (pd). The position at which the color chart was added is processed into color chart position data (id). The print image data (pd) resulting from the addition of the color chart data (cd) is subjected to RIP processing to produce image data (pd2). The production of the image data (pd2) may be performed in real time when a printing plate is exposed to light.

In step S2, an image is formed on a printing plate. Initially, either the plate cylinder 1 or 2 is moved into the image recording position and unexposed printing plates are mounted thereon. Then, on the basis of the image data (pd2), an image pattern is formed by exposure. After the exposure, the developing section 14 performs a development process. This prepress process is performed by turns on the plate cylinders 1 and 2. In step S3, a printing process is performed based on the printing plates which were made. More specifically, dampening water is supplied onto the printing plates on the plate cylinders 1 and 2, and then color inks corresponding to the respective printing plates are supplied. Ink images on the printing plates are transferred to the blanket cylinders 3 and 4 and then to printing paper on the impression cylinder 5.

In step S4, whether the number of printed sheets of paper reaches a desired value is determined. If so, the printing operation is completed. Otherwise, color chart measurement is performed in step S5 for every predetermined number of sampling sheets. The color chart measurement will be described below with reference to the flowchart of FIG. 8B. In step S6, the supply of ink or dampening water is controlled according to the color chart information obtained by the measurement of step S5, and the process returns to step S3.

Now, the process of color chart measurement according to the present invention will be set forth. Referring to FIG. 8B, in step P1, the reading time setting section 44 determines a reading time according to the color chart position data (id) obtained in step S1. In step P2, the imaging units 25R and 25L start reading at the start of the reading time. Step P3 distinguishes between the imaging units 25R and 25L. For the imaging unit 25R, the process proceeds to step P4 and for the imaging unit 25L, the process proceeds to step P5. In step P4, readout image data (rd) is stored in the forward direction in the memory of the image data storage section 45. In step P5, readout image data (rd) is stored in the backward direction in the memory of the image data storage section 45.

After the storage of the readout image data (rd) is complete, in step P6, the readout image data (rd) in each memory is subjected to image processing to detect the reference marks (rm). In step P7, a distance between the detected reference marks (rm) is computed to obtain the amount of tilt of the color chart (cc). In step P8, the actual position of each of the color chart fields (cr) is calculated based on the amount of tilt obtained, and a read address of image data in the memory is corrected.

In step P9, image data on each of the color chart fields (cr) is read out using the address corrected in response to the tilt correction. Also in step S9, image data on a corresponding white color field (hr) adjacent to the color chart field (cr) is read out. In step P10, white color data to be a white reference is determined on the basis of the image data on the white color field (hr), and using this white color data, the color density of the color chart field (cr) is corrected. In step P11, color chart information is determined. In step P12, whether there are any remaining color chart fields to be measured is determined. If so, the process returns to step P8 to repeat the measurements.

In the printing press according to the first preferred embodiment, color chart information measurement is made by reading an area including a color chart on printing paper being transported. The printing press can thus be compact in size and has the advantage of handling a smaller amount of image data. Especially, a printing press equipped with a printing plate recorder can determine a read area from color chart position information and therefore can accommodate varying image sizes which vary the position of the color chart.

In this preferred embodiment, imaging is performed on only a read area determined by the reading time setting section, but if storage capacity permits, it is also possible to read all image data on printing paper and to handle image data on only an area including a color chart on the basis of the position of the color chart. This still brings the advantage of reducing the amount of image data to be handled in image processing; however, the first preferred embodiment which requires less storage capacity is more desirable.

[Second Preferred Embodiment]

Figure 9:
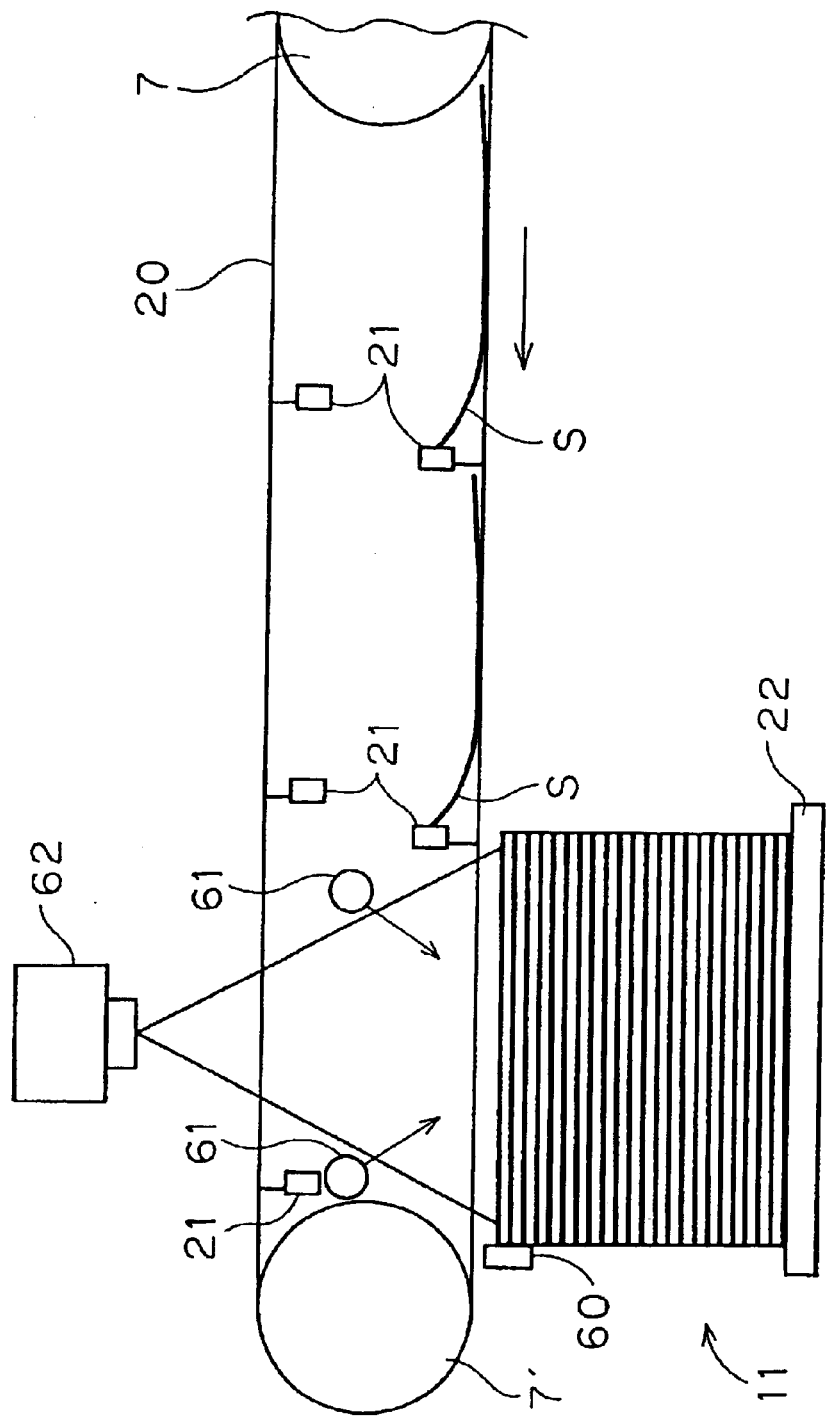
FIG. 9 is a schematic side view showing a configuration of another imaging section.

The first preferred embodiment has the advantage of compact device structure since the printing paper S being transported is sequentially read line by line. In another preferred embodiment of the present invention, the printing paper S delivered onto the paper output tray 22 may be read as shown in FIG. 9. In the present example, there are provided a positioning member 60 for roughly positioning the delivered printing paper S on the paper output tray 22, light sources 61 for illuminating the roughly-positioned printing paper S, and a CCD camera 62 for capturing an image on the printing paper S.

The positioning member 60 is for roughly positioning the printing paper S in contact with the edge of the printing paper S. It is located so that the printing paper S delivered stops against the positioning member 60. For further precise positioning, the positioning member 60 may be configured to be movable so as to place the delivered printing paper S to the corner.

The CCD camera 62 is located to be capable of capturing an image on the printing paper S by one operation and to select, out of the captured image data, image data on only an area including a color chart (cc) on the basis of the position of the color chart (cc). That is, as in the case of the first preferred embodiment, an area where the color chart (cc) is located on the printing paper S is determined as a measuring area on the basis of the position of the color chart (cc) at the time of image recording. On the basis of the measuring area, image data on only an area where the color chart (cc) is located is read out from the captured image data for subsequent image processing. Alternatively, the CCD camera 62 may be movable to an appropriate imaging position or may be able to crop out an image to capture only an image of the color chart (cc). In such a case, the CCD camera 62 should capture an image of only an area including the color chart (cc) on the basis of the measuring area and it does not have to load unnecessary image data. Instead of the CCD camera 62, a line sensor which can run over the paper output tray may be used as means for capturing an image on printing paper on the paper output tray 22. Although the second preferred embodiment requires a mechanism for roughly positioning printing paper on the paper output tray 22, it does not require a mechanism for stabilizing the transportation of printing paper, such as the suction roller 23, since there is no need to scan printing paper being transported. This preferred embodiment also allows tilt correction based on the reference marks (rm) when paper slippage occurs during delivery.

[Third Preferred Embodiment]

A third preferred embodiment is different from the first preferred embodiment in that it makes a shading correction to the CCD line sensors 29. This preferred embodiment is performed according to the following procedure.

First, a prepared white reference object is positioned at a standstill on the suction roller 23. Or, such a white reference object may be formed on the surface of the suction roller 23. The reason why a white reference object is at a standstill is that the occurrence of variations in the imaging level due to paper flapping during transport can be prevented. The imaging units 25 read the white reference object at a standstill to obtain white reference data W for each element of their respective CCD line sensors 29. Also, black reference data B (data responsive to dark current in each element) is obtained for each element. This completes preparation for the shading correction. This preparation should be made as appropriate at the factory before shipment, or at the time of maintenance, or before starting work; that is, it does not always have to accompany every operation.

In actual imaging by the CCD line sensors 29, shading correction is made to readout data Sp for each element, which is expressed for example by the equation, $Sp'=(Sp-B)/(W-B)$. This data correction should be made before and after the storage of captured image data in steps P4, P5 of FIG. 8B, for example.

[Other Preferred Embodiments]

(1) While in the first preferred embodiment, the imaging units 25 are provided in the sheet delivery section 11 to which the printing paper S is transported, the imaging units 25 may be located such that the printing paper S being transported can be read on the impression cylinder 5 or the sheet delivery cylinder 7.

(2) While in the first preferred embodiment, the color chart data (cd) is added by the control terminal 30, the print controller 31 or the like may add RIP-processed color chart data to RIP-processed print image data.

(3) While the two imaging units 25 are arranged in the first preferred embodiment, it is also possible to arrange only one or three or more imaging units 25.

(4) While in the first preferred embodiment, the color chart (cc) is located along the rear edge of the image (im), it may be located along the front edge of the image (im). In another alternative, the color chart (cc) may be positioned at a predetermined distance from the image (im), instead of immediately following the image (im). Or, it may be located in a predetermined position on printing paper depending on paper size.

While the invention has been shown and described in detail, the foregoing description is in all aspects illustrative and not restrictive. It is therefore understood that numerous modifications and variations can be devised without departing from the scope of the invention.

What is claimed is:

1. A color chart measuring method for capturing an image of a color chart having a plurality of color chart fields on printing paper and measuring color chart information on the basis of image data obtained through imaging, wherein color data corresponding to each of said color chart fields is computed from image data on each of said chart fields, and white color data corresponding to each of said color chart fields is computed from image data on an unprinted area in the close vicinity of each of said color chart fields; and in determining said color chart information on the basis of said image data on each of said color chart fields, a correction is made to said color data on each of said color chart fields on the basis of corresponding one of said white color data.

2. The color chart measuring method according to claim 1, wherein
imaging of said color chart is carried out while said printing paper is being transported.

3. The color chart measuring method according to claim 2, wherein
imaging of said color chart is carried out by means of an imaging section including a plurality of imaging devices, and
said imaging section reads a white reference object which was positioned at a standstill before the imaging of said color chart and uses said white reference object to make a shading correction on said image data.

4. The color chart measuring method according to claim 1, wherein
a color density D for each of said color chart fields is found from $D=-k \times \log(c1/c0)$, where $c1$ is color data on each of said color chart fields, $c0$ is white color data on a corresponding unprinted area, and k is a gain coefficient.

5. A color chart measuring apparatus installed in a printing press for doing multicolor printing on printing paper, said measuring apparatus capturing an image of a color chart having a plurality of color chart fields on said printing paper and measuring color chart information on the basis of image data obtained through imaging, said measuring apparatus comprising:

an imaging section for reading an image including said color chart and an unprinted area in the close vicinity of said color chart on said printing paper being transported;

a computation section for computing color data on each of said color chart fields and white color data on an unprinted area in the vicinity of each of said color chart fields from said image data obtained through imaging by said imaging section; and a white color correction section for correcting said color data using corresponding one of white color data.

* * * * *